June 11, 1968 G. DE COYE DE CASTELET 3,387,507
VARIABLE SPEED FRICTION TRANSMISSIONS FOR VEHICLES
Filed Oct. 6, 1965 2 Sheets-Sheet 1
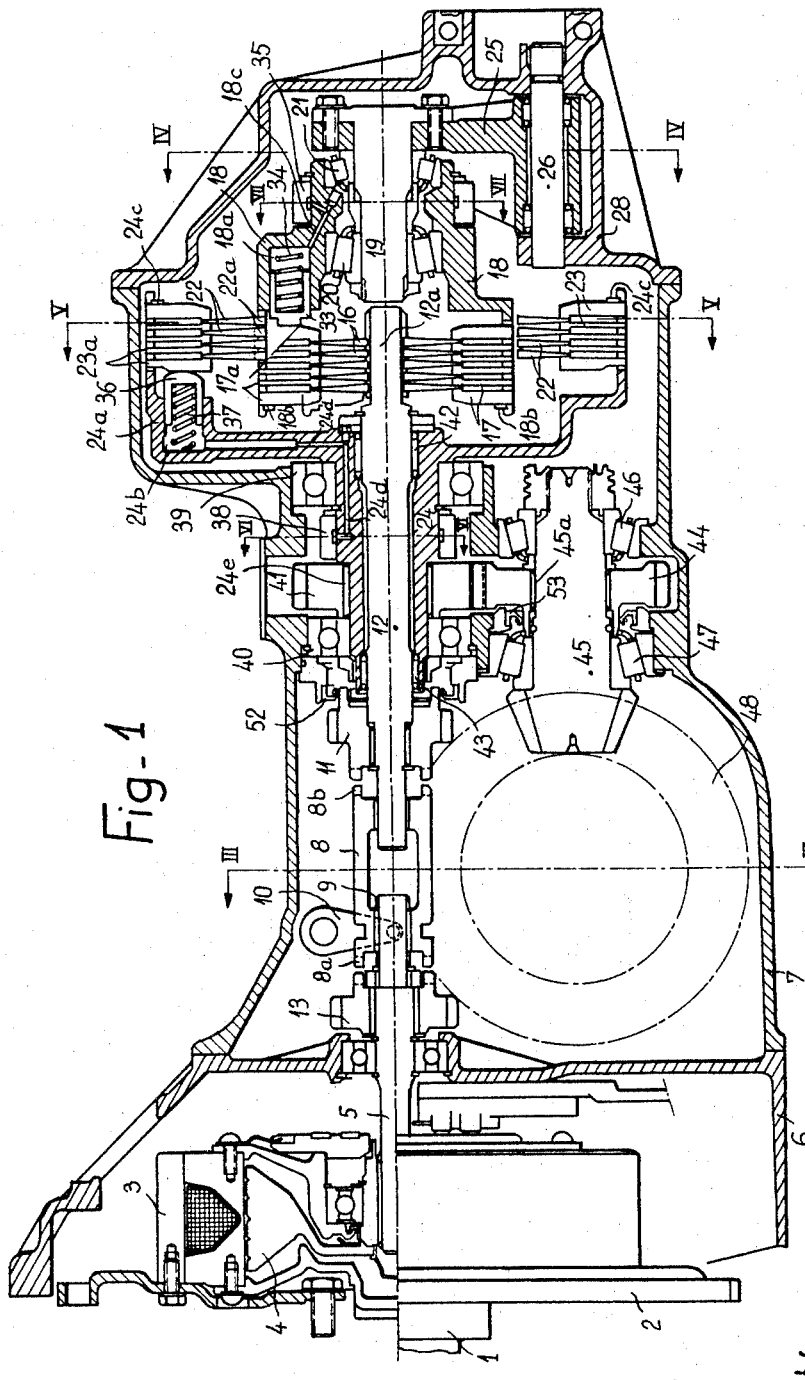
Inventor
Gaëtan De Coye De Castelet
Stevens, Davis, Miller & Mosher
Attorneys

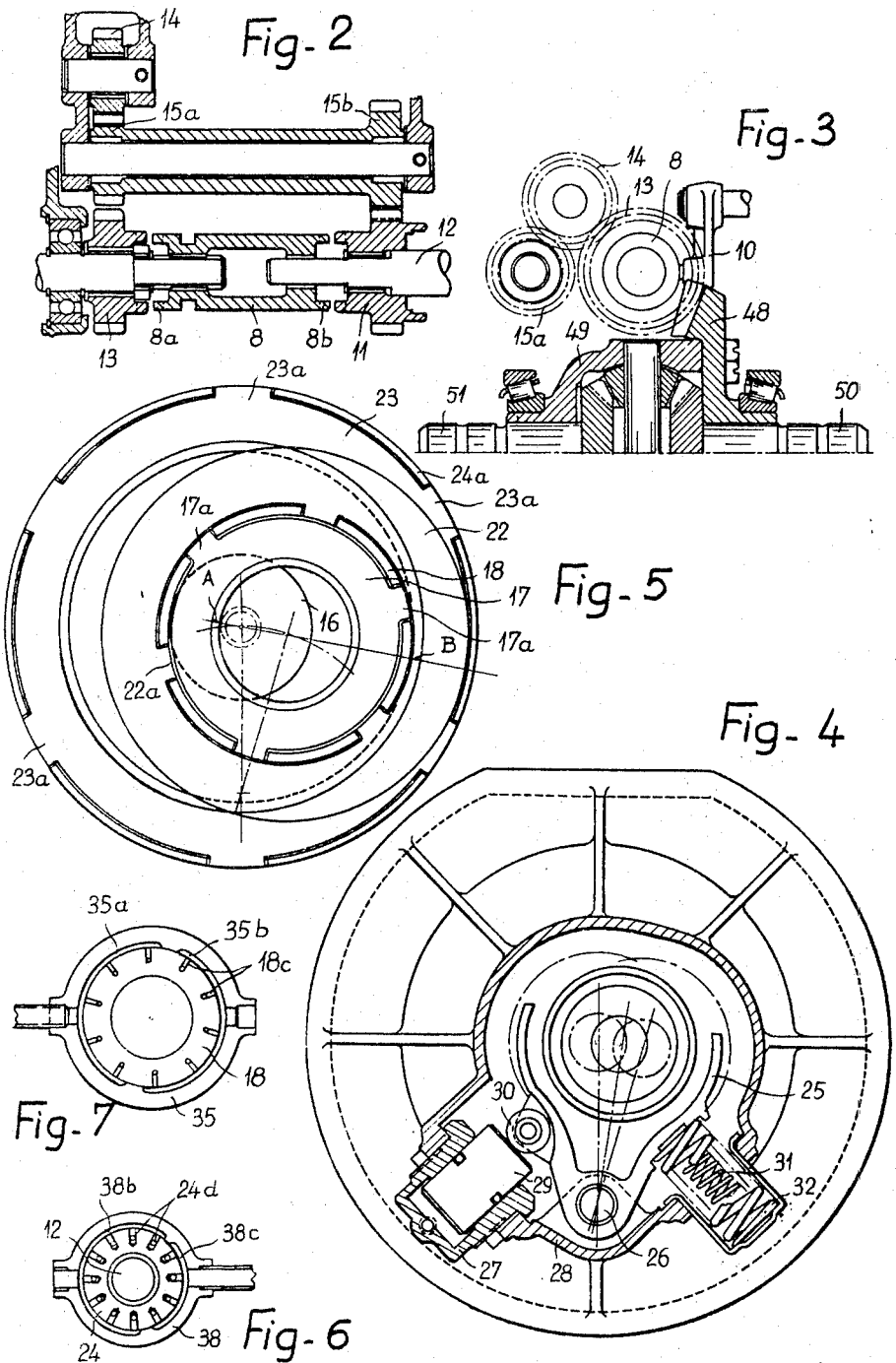

3,387,507
VARIABLE SPEED FRICTION TRANSMISSIONS
FOR VEHICLES
Gaëtan de Coye de Castelet, Billancourt, France, assignor to Regie Nationale des Usines Renault, Billancourt, France
Filed Oct. 6, 1965, Ser. No. 493,359
Claims priority, application France, Apr. 16, 1965, 13,627, Patent 1,450,492
5 Claims. (Cl. 74—796)

ABSTRACT OF THE DISCLOSURE

A transmission having a speed varying friction gear of the type comprising internally tangential conical friction surfaces, two stages of speed reduction, coaxial input and output shafts, and an intermediate shaft movable transversely while remaining parallel to the input and output shafts. The input and output shafts are both concentric and located on the same side of the speed varying mechanism.

___

Various kinds of continuous speed variation friction devices are known, constituted by multiple elements or discs provided with conical friction surfaces having the same apex angle, the driving element and the driven element being externally or internally tangential and having parallel axes of rotation, the relative position of which can be modified to vary the ratio of transmission.

Amongst these systems, those employing internally tangential male and female conical surfaces have special advantages due to the fact that when the axes of the driving and driven members are coincident, the male and female conical surfaces are in contact over their whole circumference, thus producing a direct ratio drive.

In addition, by arranging two speed-varying devices of this kind functionally in series, one between the input shaft and an intermediate shaft, the other between the intermediate shaft and an output shaft coaxial with the input shaft, by displacing the intermediate shaft alone parallel to itself between a position in which it is coaxial with the input and output shafts and a maximum position of eccentricity, it is possible to vary the ratio of transmission of the whole assembly between the value 1/1 corresponding to a direct drive ratio, and a value equal to the product of the transmission ratios of each of the two speed-varying devices taken separately.

The known arrangement, in which the discs rotating with the intermediate shaft are mounted at the two extremities of the shaft, which rotates in bearings arranged in its central portion and is carried by a moving member, the movement of which displaces the intermediate shaft with respect to the common axis of the input and output shafts, is readily applicable to an inline transmission, that is to say in which the input and output shafts are at the opposite extremities of the speed-varying mechanism. Even in this case however, it has the disadvantage of having a not-negligible longitudinal size.

With vehicles comprising an engine-transmission unit, in which the input and output shafts are usually on the same side of the speed-varying mechanism, this arrangement has further disadvantages, namely in that the output movement is effected by a shaft concentric with the input shaft and passing through the intermediary member, which makes it necessary to give the latter, and in particular its bearings, a large diameter, or in that it is effected by a parallel shaft driven by a pair of gears, the presence of this shaft limiting the diameter which it is possible to give to the friction elements.

The main object of the present invention is an arrangement of the assembly of two speed-varying friction devices working in series concentrically one inside the other, which has a number of advantages:

That of the two speed-varying devices which is mounted for working on the downstream side and which has to transmit torques already multiplied by the first speed-varying device, is arranged outside the latter, which enables it to be given a large diameter and thus correspondingly reduces the axial application force of the friction surfaces;

The input shaft and the output shaft of this assembly of two speed-varying devices are concentric and placed on the same side, which is especially advantageous for vehicles with engine-transmission sets and permits the use of a speed-varying device of large diameter;

The moving gear carrying the intermediate shaft is arranged on the opposite side to the two shafts above-mentioned, together with the control for its displacement, which facilitates its production, its design and the assembly of the intermediate shaft on bearings of reasonable diameter.

A further object of the invention is to ensure an axial clamping of the discs of the speed-varying devices, not only in the known manner by springs, but in addition by pistons subjected to hydraulic pressure, the distribution of this pressure over the circumference of the discs being such that it is applied selectively on the portion of circumference at which is located the tangential zone of the driving and driven elements. In addition, the hydraulic pressure may be modulated as a function of the torque to be transmitted, which, when the latter is small, simultaneously reduces the losses by friction and the force necessary to displace the intermediate gear for the purpose of varying the ratio of transmission.

Another object of the invention is a general arrangement of a mechanism for an engine-transmission set of small longitudinal size, in which the device for reversing the direction of running is mounted in the casing of the final speed-reduction gear, and is located functionally between the automatic starting-up clutch and the speed-varying gear, so that it is not subjected, when the vehicle is stationary, to any residual torque due to the friction between the discs and which is liable to interfere with its operation.

The invention will now be described by way of example and without implied limitation, with reference to the accompanying drawings, in which:

FIG. 1 shows a mechanism according to the invention in longitudinal section taken along the axis;

FIG. 2 shows the reversing gear for the direction of running, in developed cross-section;

FIG. 3 is a cross-section taken along the line A—A of this same device;

FIG. 4 shows the cross-section B—B of the reduction gear control by eccentricity of the gear;

FIG. 5 shows the two points of contact of the two series of conical surfaces, male and female, in the position of maximum eccentricity;

FIGS. 6 and 7 show the two hydraulic pressure distributors intended to provide the axial clamping of the speed-varying discs.

Referring to the drawings and more particularly to FIG. 1, between the driving shaft 1 and the input shaft 5 of the mechanism there is mounted an automatic starting clutch which forms no part of the invention and which may be of any known type. In the example chosen, it has been shown as an electromagnetic power clutch, the electromagnet 3 of which is carried by the driving plate, provided at its periphery with the starter ring 2, and the receiving element 4 of which is rigidly fixed for rotation to the input shaft 5 of the mechanism. The starting clutch is mounted within casing 6.

As soon as it passes into the casing 7, the shaft 5 drives in rotation a dog-clutch sleeve 8 through the intermediary of splines 9 which permit the sleeve 8 to slide axially, its displacement being operated by the fork 10.

Each extremity of the sleeve 8 is provided with dog clutches 8a and 8b. The dogs 8b can directly drive the pinion 11 rigidly fixed to the primary shaft 12 of the speed-varying device. The dogs 8a can drive the pinion 13, which in turn drives the pinions 14, 15a and 15b, this latter engaging with the pinion 11 rigidly fixed on the primary shaft 12 (see FIGS. 1, 2 and 3).

The assembly which has just been described constitutes a conventional direction-reversing device, in which the particular feature in the mechanism forming the object of the present invention is that it is arranged for operation between the starting clutch and the input of the speed-varying gear, and is constructionally housed in the same casing as the differential, this arrangement being made possible by the small diametral size of the sleeve 8, which enables a small distance to be maintained between the axis of the primary shaft of the mechanism and the axis of the differential.

The primary shaft 12 of the speed-varying device terminates, on the side opposite to the sleeve 8, in a splined portion 12a which drives in rotation with freedom of axial sliding the male bi-conical discs 16 which constitute the primary of the first stage of the speed-varying device.

These primary discs 16 are intercalated with female secondary discs 17 fast for rotation with a hub 18. In the position shown in FIG. 1, the shaft 12 is coaxial with the hub 18; the discs 16 and 17 are in contact over their whole circumference and the transmission of the movement is effected in direct drive or top gear.

The hub 18 is mounted on a journal shaft 19, for example by means of tapered roller bearings 20 and 21. The hub carries the bi-conical male discs 22 constituting the primary element of the second stage which are also fast for rotation therewith, and working inside secondary female discs 23 fixed for rotation with the ring 24a rigidly secured to the shaft 24.

In the position shown in FIG. 1, where the hub 18 is coaxial with the input shaft of the mechanism, the discs 22 and 23 are also in contact over their entire circumference and transmit the movement in direct coupling.

In fact, the shaft 24 is tubular and concentric with the shaft 12 which it carries by means of bearings such as 42 and 43. In its turn, it is carried in the casing 7 through the intermediary of two bearings 39 and 40, and drives a pinion 41 in rotation through the intermediary of splines 24e.

The pinion 41 engages with a pinion 44 rigidly fixed on the output shaft 45 which carries the pinion of the pair of bevel wheels. The shaft 45 is carried in the casing by the bearings 46 and 47. In the usual manner, the ring 48 of the bevel gears is fixed to the casing 49 of the differential, the output shafts of which have been given the references 50 and 51 (see FIG. 3).

The journal shaft 19 is fixed to a crank 25 which can oscillate about a shaft 26 from the initial position shown in FIG. 1, in which the journal shaft 19 is coaxial with the shafts 12 and 24, up to a position of maximum eccentricity shown in FIG. 5. This maximum eccentricity is fixed in such manner as to obtain, for each stage of the speed-varying device, a stepdown ratio of transmission, A and B being then respectively the projection of the contact zones of the discs 16 and 17 of the first stage and of the discs 22 and 23 of the second stage (see FIG. 5).

FIG. 4 gives a non-limitative example of an eccentricity control for the step-down gear described above. A jack working with fluid under pressure, the cylinder 27 of which is rigidly fixed to the cover 28 of the casing 7, and the piston 29 of which can move the crank 25, through the intermediary of a roller 30, against the action of restoring springs such as 31 and 32.

In the hub 18, cylinders 18a are bored at uniformly-distributed distances along a circumference, in which cylinders slide pistons 33 which springs 34 push against the disc 17, retained by the abutment 18b and clamping the discs 16.

On the action of the spring 34 is superimposed that of hydraulic pressure acting on the pistons 33. This pressure is distributed to the cylinders 18a through the intermediary of channels 18c (see FIGS. 1 and 7) put into communication with a distributor 35 which only supplies them over a fraction of a revolution.

To this end, the internal groove of the distributor ring 35 is divided into two zones, each extending over a certain arc of a circle and having no communication with each other. One of these zones 35a is in communication with a source of pressure. The other zone 35b is in communication with a chamber at low or zero pressure. The conduits 18c which open into the zone 35a correspond to the cylinders 18a located on the side of the contact zone A.

A similar arrangement is provided on the shaft 24 in order to be able to clamp the male discs 22 between the female discs 23. The ring 24a is provided on its circumference with cylinders 24b having pistons 36 which apply an initial pressure on the discs 23 by means of springs 37. A stop 24c prevents the discs 23 from passing out of the ring 24a.

A distributor 38 supplies, over a fraction of a revolution, the conduits 24d coupled to the cylinders 24b (see FIGS. 1 and 6). The groove of the distributor ring 38 is also divided into two zones 38a and 38b respectively connected to the high and low pressure.

The source of high pressure (not shown) is for example a pump of any known type driven by the engine or by the input shaft of the mechanism. The pressure supplied by this pump can be modulated in a manner known per se so as to vary in the same sense as the torque supplied by the engine.

The operation of the speed-varying gear is as follows:

When the axis of the spindle shaft 19 is in line with that of the input shaft 12, the male and female discs, both in the first stage 16–17 and in the second stage 22–23 of the speed-varying device, are in contact over their entire circumference and the whole mechanism behaves like a clutch with multiple discs, transmitting the movement by direct coupling without reduction of speed.

In order to obtain a variation of the ratio of transmission in the sense of reduction of speed and stepping-up of torque, fluid under pressure is fed to the cylinder 27 to act on the piston 29 and this has the effect of causing the crank 25 to rock and move, parallel to itself, the axis of the spindle shaft 19. At the same time the springs 31 and 32 are compressed. For each value of the fluid pressure existing in the cylinder 27 there will be a corresponding position of the crank 25, depending on the flexibility of the springs 31 and 32. A suitable value for this fluid pressure can be obtained by an automatic governor device such as that described in French Patent No. 1,232,550 of Apr. 23, 1959, by the present applicant, with the title "Automatic Governor for Transmission With Continuous Speed-Varying Device."

When the axis of the spindle shaft 19 has moved away from that of the shaft 12, the cones of the first stage of the speed-varying gear are no longer in contact, except along one of their generator lines, and the hub 18 is driven at reduced speed in the ratio of the effective radii (distances from the point A to the two axes of rotation considered). Similarly, in the second stage of the speed-varying gear, there is a speed reduction between the hub 18 and the shaft 24 in the ratio of the effective radii (distances from the point B to the two axes of rotation considered). The overall transmission ratio between the input shaft 12 and the output shaft 24 is equal to the product of the ratios of transmission of each of the two stages.

The clamping of the discs between each other in order to obtain the transmission of the movement between the male and female discs with a minimum of slip, is effected for each stage by the conjoint action of the springs such as 34 or 37 and of the pressure of fluid acting on the piston 33 or 36. The strength of the spring 34 or 37 may be calculated in such manner that in the absence of fluid pressure the speed-varying gear can drive the engine from the movement of the vehicle wheels so that it can be started up in the event of failure of the starter. The modulation of the fluid pressure as a function of the driving torque permits the clamping force of the discs to be proportioned to the torque to be transmitted. By virtue of the selective distribution of the pressure over the circular arc in which the contact generator is located, the discs have no tendency to rock, as would be the case if they were subjected to a uniformly distributed clamping force while at the same time being in contact only in one single radial direction.

The two main parts of the mechanism: reversing gear on the one hand and speed-varying friction gear on the other, work in oil. However, the operation of the bevel wheels located in the same part of the casing as the reversing gear may necessitate the use of high-pressure oil which is not suitable for the operation of the speed-varying friction gear. In the mechanism forming the object of the present invention, the partition carrying the bearings 40 and 47 separates the two parts of the casing. It may be made fluid-tight by the addition of seals such as 52 and 53.

I claim:

1. A transmission having a speed-varying friction gear of the type with a plurality of internally tangential conical friction surface discs forming at least two stages of speed reduction comprising a casing, concentric coaxial input and output shafts mounted in said casing on one side of said friction gear, an intermediate shaft, said intermediate shaft being mounted for movement transversely from a position of axial alignment with said first two shafts to a displaced position, said intermediate shaft at all times being parallel to said first two shafts, a first stage of said friction gear being operatively connected to said input shaft, a second stage of said friction gear being operatively connected to said output shaft, means on said intermediate shaft for selectively contacting said first and second stages, said intermediate shaft comprising a stub axle located on the opposite side of said speed varying gear from the input and output shafts and a hub mounted on said stub axle, a crank articulated about an axis parallel to the axis of said first and second shafts, said stub axle being fixedly mounted on a free end of said crank, said crank being movable between a first position wherein said stub axle is coaxial with the input and output shafts, and a displaced second position corresponding to a maximum eccentricity of the speed varying gear, and means to displace said crank.

2. A speed varying friction transmission in accordance with claim 1 further comprising a starting clutch, a reversing gear mechanism operatively connected between said speed-varying gear and said starting clutch, a portion of said casing containing said reduction gear and said speed varying gear, said portion being isolated in a fluid-tight manner from the remainder of the casing containing the speed-varying gear.

3. A speed-varying friction transmission in accordance with claim 1 in which said means to displace said crank comprises at least one hydraulic jack acting against at least one restoring spring.

4. A speed-varying friction transmission in accordance with claim 1 in which axial clamping of the discs in each of the stages of the speed-varying gear is obtained by the conjoint action of springs and fluid actuated pistons the displacement of which is modulated as a function of the torque being transmitted.

5. A speed-varying friction transmission in accordance with claim 4 in which the fluid pressure which ensures the clamping of the discs is applied selectively over a limited arc of their circumference, the generator line of contact being located inside said arc.

References Cited

UNITED STATES PATENTS

| | | | |
|---|---|---|---|
| 2,595,439 | 5/1952 | Arato | 74—199 |
| 3,006,206 | 10/1961 | Kelley et al. | 74—208 X |
| 3,055,232 | 9/1962 | Dodge | 74—688 X |
| 3,099,927 | 8/1963 | Anderson | 74—796 |
| 3,132,536 | 5/1964 | Sampietro | 74—688 X |
| 3,151,717 | 10/1964 | Kaptur et al. | 74—796 X |
| 3,158,036 | 11/1964 | Hughson | 74—208 X |
| 3,202,012 | 8/1965 | Jama | 74—472 |
| 3,209,617 | 10/1965 | Kalversburg | 74—688 |
| 3,246,532 | 4/1966 | Anderson et al. | 74—199 |
| 3,238,818 | 3/1966 | Heintz | 74—796 |

FOREIGN PATENTS

| | | |
|---|---|---|
| 1,275,111 | 9/1961 | France. |
| 138,443 | 10/1960 | Russia. |
| 331,934 | 9/1958 | Switzerland. |

FRED C. MATTERN, Jr., *Primary Examiner.*

DONLEY J. STOCKING, *Examiner.*

J. R. BENEFIEL, *Assistant Examiner.*